(12) United States Patent
Li et al.

(10) Patent No.: US 10,303,601 B2
(45) Date of Patent: May 28, 2019

(54) METHOD AND SYSTEM FOR REARRANGING A WRITE OPERATION IN A SHINGLED MAGNETIC RECORDING DEVICE

(71) Applicant: Alibaba Group Holding Limited, George Town, Grand Cayman (KY)

(72) Inventors: Shu Li, Bothell, WA (US); Xiaowei Jiang, San Mateo, CA (US)

(73) Assignee: Alibaba Group Holding Limited, George Town (KY)

( * ) Notice: Subject to any disclaimer, the term of this patent is extended or adjusted under 35 U.S.C. 154(b) by 0 days.

(21) Appl. No.: 15/675,416

(22) Filed: Aug. 11, 2017

(65) Prior Publication Data

US 2019/0050327 A1 Feb. 14, 2019

(51) Int. Cl.
*G06F 12/00* (2006.01)
*G06F 12/02* (2006.01)
*G06F 3/06* (2006.01)

(52) U.S. Cl.
CPC .......... *G06F 12/0292* (2013.01); *G06F 3/061* (2013.01); *G06F 3/064* (2013.01); *G06F 3/0608* (2013.01); *G06F 3/0611* (2013.01); *G06F 3/0613* (2013.01); *G06F 3/0626* (2013.01); *G06F 3/0676* (2013.01); *G06F 12/0253* (2013.01)

(58) Field of Classification Search
CPC .. G06F 12/0253; G06F 12/0292; G06F 3/061; G06F 3/0611; G06F 3/0613; G06F 3/0626; G06F 3/064; G06F 3/0676; G06F 17/30135; G06F 3/0608
See application file for complete search history.

(56) References Cited

U.S. PATENT DOCUMENTS

| 4,775,932 A | 10/1988 | Oxley |
| 6,226,650 B1 | 5/2001 | Mahajan et al. |
| 7,565,454 B2 | 7/2009 | Zuberi |
| 8,260,924 B2 | 9/2012 | Koretz |
| 8,452,819 B1 | 5/2013 | Sorenson, III |
| 8,516,284 B2 | 8/2013 | Chan |

(Continued)

FOREIGN PATENT DOCUMENTS

| JP | 2003022209 | 1/2003 |
| JP | 2011175422 | 9/2011 |
| WO | 1994018634 | 8/1994 |

OTHER PUBLICATIONS https://web.archive.org/web/20071130235034/http://en.wikipedia.org:80/wiki/logical_block_addressing wikipedia screen shot retriefed on wayback Nov. 20, 2007 showing both physical and logical addressing used historically to access data on storage devices (Year: 2007).

*Primary Examiner* — Shawn X Gu
(74) *Attorney, Agent, or Firm* — Shun Yao; Park, Vaughan, Fleming & Dowler LLP

(57) ABSTRACT

One embodiment facilitates a write operation in a shingled magnetic recording device. During operation, the system receives, by a controller module of the device, a request to write first data, wherein the device has a plurality of bands with overlapping tracks for storing data. In response to determining that the first data is updated data corresponding to original data stored in a first band, the system appends the updated data to a second band with available storage space. The system merges the updated data with the original data.

19 Claims, 13 Drawing Sheets

(56) References Cited

U.S. PATENT DOCUMENTS

| | | |
|---|---|---|
| 9,092,223 B1 | 7/2015 | Pani |
| 2002/0010783 A1 | 1/2002 | Primak |
| 2002/0161890 A1 | 10/2002 | Chen |
| 2004/0010545 A1 | 1/2004 | Pandya |
| 2004/0255171 A1 | 12/2004 | Zimmer |
| 2004/0268278 A1 | 12/2004 | Hoberman |
| 2005/0038954 A1 | 2/2005 | Saliba |
| 2005/0097126 A1 | 5/2005 | Cabrera |
| 2005/0177755 A1 | 8/2005 | Fung |
| 2005/0235171 A1 | 10/2005 | Igari |
| 2006/0156012 A1 | 7/2006 | Beeson |
| 2007/0033323 A1 | 2/2007 | Gorobets |
| 2009/0282275 A1 | 11/2009 | Yermalayeu |
| 2010/0229224 A1 | 9/2010 | Etchegoyen |
| 2010/0325367 A1 | 12/2010 | Kornegay |
| 2011/0055458 A1 | 3/2011 | Kuehne |
| 2011/0153903 A1 | 6/2011 | Hinkle |
| 2011/0231598 A1 | 9/2011 | Hatsuda |
| 2011/0292538 A1* | 12/2011 | Haga ............... B82Y 25/00 360/60 |
| 2011/0302353 A1 | 12/2011 | Confalonieri |
| 2012/0117399 A1 | 5/2012 | Chan |
| 2012/0246392 A1 | 9/2012 | Cheon |
| 2013/0073798 A1 | 3/2013 | Kang |
| 2013/0145085 A1 | 6/2013 | Yu |
| 2013/0145089 A1 | 6/2013 | Eleftheriou |
| 2013/0159251 A1 | 6/2013 | Skrenta |
| 2013/0166820 A1 | 6/2013 | Batwara |
| 2013/0173845 A1 | 7/2013 | Aslam |
| 2013/0318283 A1 | 11/2013 | Small |
| 2014/0233950 A1 | 8/2014 | Luo |
| 2014/0250259 A1 | 9/2014 | Ke |
| 2014/0310574 A1 | 10/2014 | Yu |
| 2014/0359229 A1 | 12/2014 | Cota-Robles |
| 2014/0365707 A1 | 12/2014 | Talagala |
| 2015/0082317 A1 | 3/2015 | You |
| 2015/0106556 A1 | 4/2015 | Yu |
| 2015/0142752 A1 | 5/2015 | Chennamsetty |
| 2015/0372597 A1 | 12/2015 | Luo |
| 2016/0098344 A1 | 4/2016 | Gorobets |
| 2016/0110254 A1 | 4/2016 | Cronie |
| 2016/0232103 A1 | 8/2016 | Schmisseur |
| 2016/0239074 A1 | 8/2016 | Lee |
| 2016/0239380 A1* | 8/2016 | Wideman ............ H03M 13/373 |
| 2016/0343429 A1 | 11/2016 | Nieuwejaar |
| 2016/0350002 A1 | 12/2016 | Vergis |
| 2017/0168986 A1 | 6/2017 | Sajeepa |
| 2017/0353576 A1 | 12/2017 | Guim Bernat |
| 2018/0024772 A1 | 1/2018 | Madraswala |
| 2018/0088867 A1 | 3/2018 | Kaminaga |

\* cited by examiner

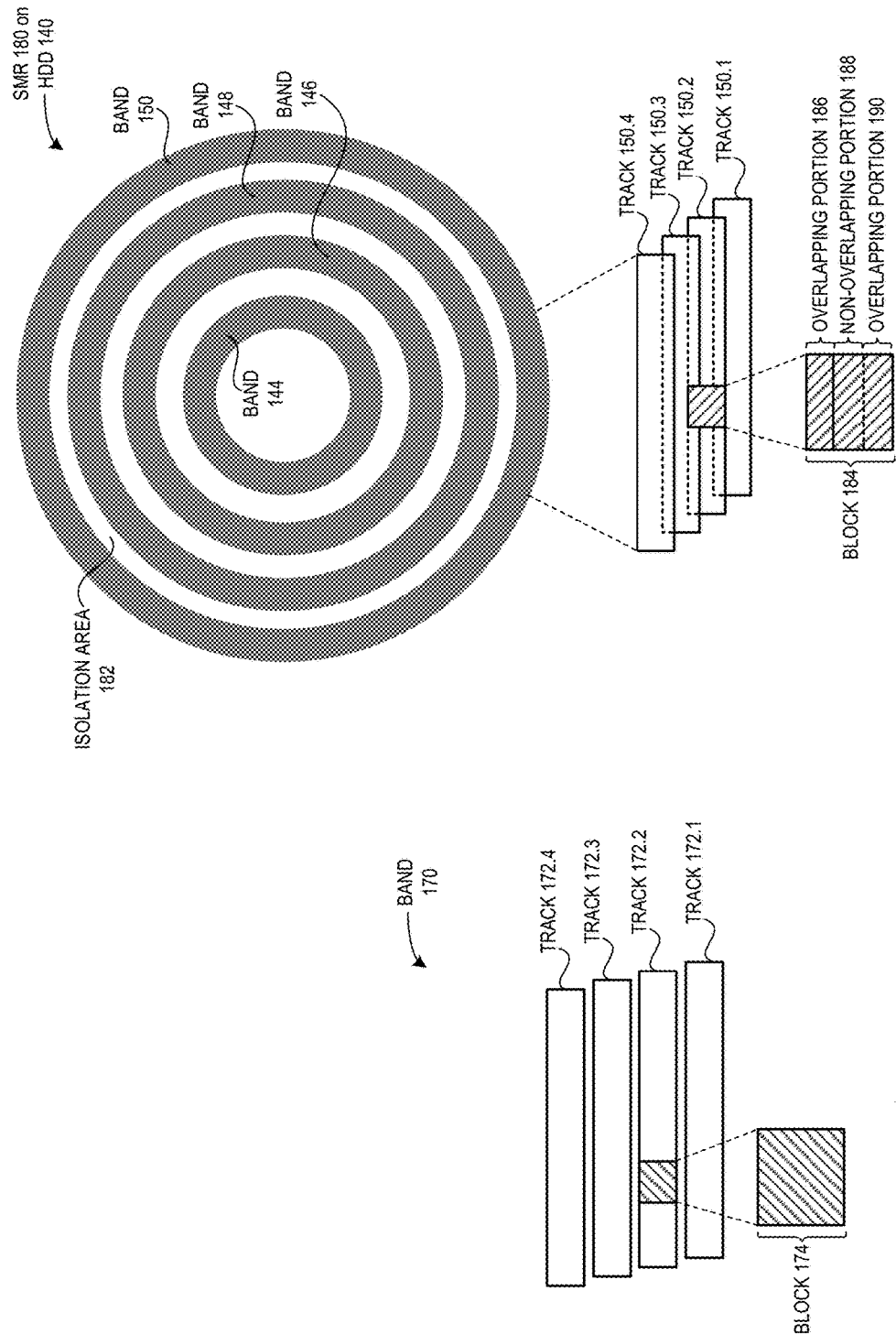

METHOD AND SYSTEM FOR REARRANGING A WRITE OPERATION IN A SHINGLED MAGNETIC RECORDING DEVICE

BACKGROUND

Field

This disclosure is generally related to the field of data storage. More specifically, this disclosure is related to a method and system for rearranging a write operation in a shingled magnetic recording device for improved system performance.

Related Art

The proliferation of the Internet and e-commerce continues to create a vast amount of digital content. Various storage systems have been created to access and store such digital content. In a standard storage system, a server may store data in a non-volatile memory, such as shingled magnetic recording (SMR). While conventional hard disk drives record data by writing non-overlapping magnetic tracks parallel to each other (perpendicular recording), an SMR device writes new tracks that overlap part of the previously written magnetic track. The tracks partially overlap similar to roof "shingles." A narrower track width can result in a higher track density and an increased storage capacity. Furthermore, SMR can address physical limitations which prevent recording magnetic heads from having the same width as reading heads, leaving recording heads wider.

However, while SMR addresses some physical limitations, SMR introduces others. The overlapping-tracks architecture may create efficiencies in performing a write operation. While writing or appending data to SMR in a sequential manner may not affect neighboring or overlapping tracks, writing data randomly to a portion of a band which already stores data may result in a delay. This delay may occur because writing data to one track can require re-writing data to the neighboring or overlapping tracks. That is, the system must read out the entire band, modify the specific portion, and write back the entire modified band. In the case where the update is small in comparison so the size of the band (e.g., a 4 KB update sector in comparison to a 128 MB or a 256 MB sequential write block or band), the write amplification may result in a high latency, which can decrease the efficiency of a storage system.

SUMMARY

One embodiment facilitates a write operation in a shingled magnetic recording device. During operation, the system receives, by a controller module of the device, a request to write first data, wherein the device has a plurality of bands with overlapping tracks for storing data. In response to determining that the first data is updated data corresponding to original data stored in a first band, the system appends the updated data to a second band with available storage space. The system merges the updated data with the original data.

In some embodiments, merging the updated data with the original data comprises: reading out the original data from the first band; modifying the original data based on the updated data appended to the second band; and writing back the modified data to the first band or another band.

In some embodiments, merging the updated data with the original data is in response to detecting a condition based on one or more of: a time interval or a frequency; determining that the available storage space of the second band is less than a predetermined threshold; and determining that a logical block address of the first data has been mapped to a physical block address more than a predetermined number of times.

In some embodiments, in response to determining that the first data is updated data corresponding to original data stored in the first band, the system, in response to determining that the available storage space of the second band is less than a predetermined threshold, obtains a new band from a pool of free bands and appends a remainder of the first data to the new band. The system updates a mapping of a logical block address of the first data to a physical block address of the device.

In some embodiments, in response to determining that the first data is updated data corresponding to original data stored in the first band, the system marks as invalid a corresponding portion of the original data of the first band and performs a defragmentation operation based on the marked data. The system also, in response to determining an available band based on the defragmentation operation, releases the available band to the free band pool.

In some embodiments, in response to determining that the first data is not updated data corresponding to original data stored in the bands, the system: accumulates new data in a buffer by storing the first data in the buffer. The system also, in response to determining that the buffer includes data of a size sufficient to fill an entire band: obtains a new band from a pool of free bands; writes the accumulated data from the buffer to the new band; and updates a mapping of a logical block address of the accumulated new data to a physical block address of the device.

In some embodiments, the updated data is appended to the second band starting sequentially from a first available portion of the second band.

In some embodiments, in response to determining that the first data is updated data corresponding to original data stored in the first band, the system: determines that a spare sector may be allocated for storing the first data; allocates the spare sector; writes the first data to the allocated spare sector; and updates a mapping of a logical block address of the first data to a physical block address of the device.

In some embodiments, the plurality of bands includes a first group of bands and a second group of bands. New data is written to the first group, and updated data corresponding to data stored in the first group is written to the second group.

In some embodiments, the device includes a spare sector area. New data is written to the plurality of bands, and updated data corresponding to data stored in the first group is written to the spare sector area.

Another embodiment facilitates a storage device with a plurality of bands with overlapping tracks for storing data, and a controller module. The plurality of bands includes a first group of bands and a second group of bands, wherein new data is written to the first group, and wherein updated data corresponding to data stored in the first group is written to the second group. The controller module is configured to: receive a request to write first data; in response to determining that the first data is updated data corresponding to original data stored in a first band, append the updated data to a second band with available storage space; and merge the updated data with the original data.

BRIEF DESCRIPTION OF THE FIGURES

FIG. 1B illustrates the placement of tracks in a conventional band, in accordance with the prior art.

FIG. 1C illustrates an exemplary shingled magnetic recording on an HDD, in accordance with an embodiment of the present application.

In the figures, like reference numerals refer to the same figure elements.

DETAILED DESCRIPTION

Figure 1A:
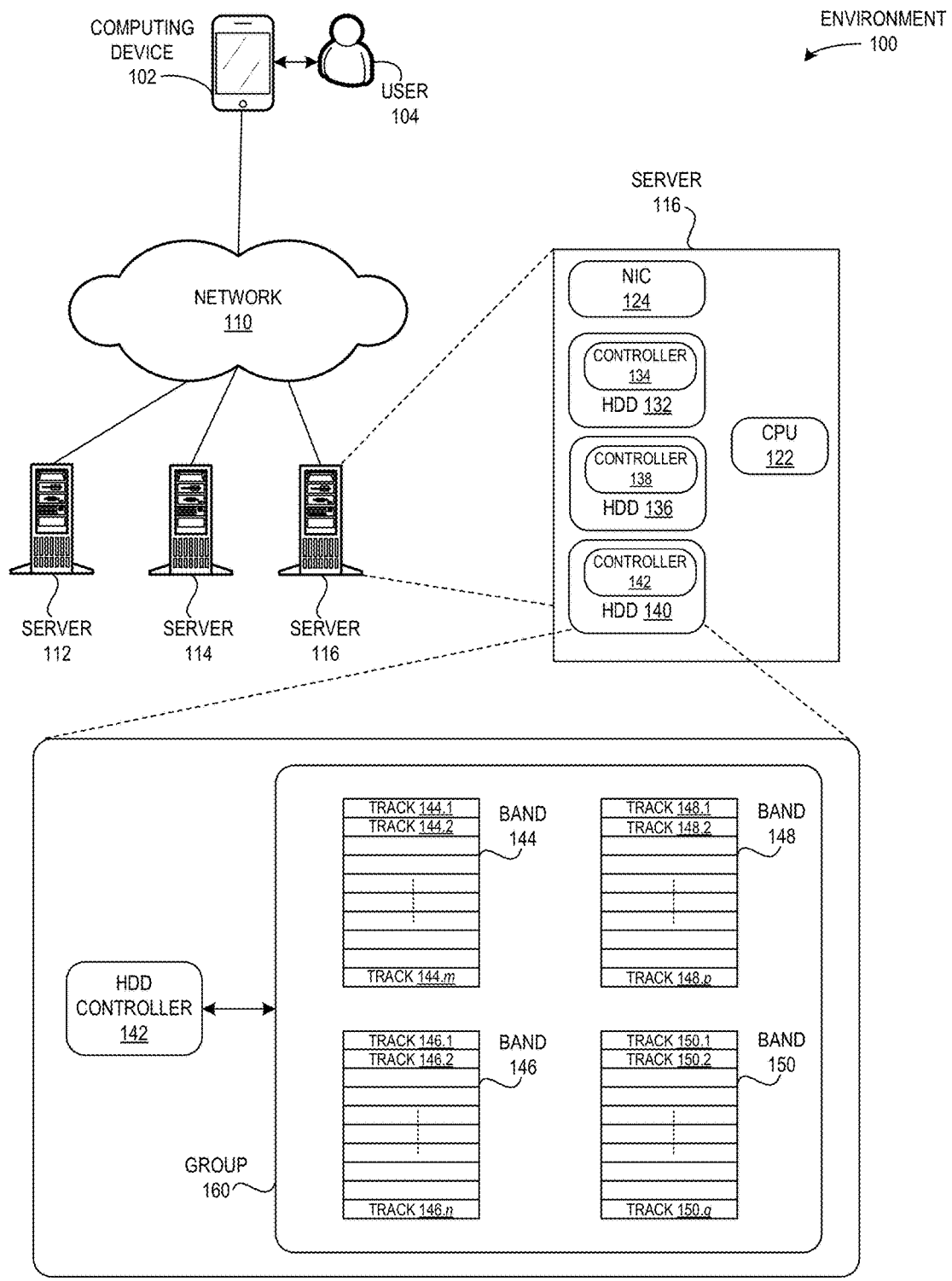
FIG. 1A illustrates an exemplary environment that facilitates a write operation in a shingled magnetic recording device, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein solve the problem of facilitating a write operation in a shingled magnetic recording (SMR) device by appending updated data (i.e., data corresponding to an update for previously stored original data) to a band other than the band storing the original data. The system can subsequently perform a background operation to merge the updated data with the original data, thus avoiding the high latency involved to read out the original data, modify the original data with the updated data, and write back the modified data.

Recall that a conventional hard disk drive records data by writing non-overlapping magnetic tracks parallel to each other (perpendicular recording). In contrast, a shingled magnetic recording (SMR) device stores data in overlapping tracks arranged similar to overlapping roof "shingles," where the narrower track width can result in an increased track density and storage capacity. SMR can also address physical limitations which prevent recording magnetic heads from having the same width as reading heads, leaving recording heads wider.

However, while SMR addresses some physical limitations, SMR introduces others. The overlapping-tracks architecture may create efficiencies in performing a write operation. While writing or appending data to SMR in a sequential manner may not affect neighboring or overlapping tracks, writing data randomly to a portion of a band which already stores data may result in a delay. This delay may occur because writing data to one track can require re-writing data to the neighboring or overlapping tracks. That is, the system must read out the entire band, modify the specific portion, and write back the entire modified band. In the case where the update is small in comparison so the size of the band (e.g., a 4 KB update sector in comparison to a 128 MB or a 256 MB sequential write block or band), the write amplification may result in a high latency, which can decrease the efficiency of a storage system.

The embodiments described herein address this inefficiency by providing a storage system which "rearranges" a write operation when data is stored in a plurality of bands with overlapping tracks. The system can rearrange a write operation by: determining updated data corresponding to data stored in a first band; appending the updated data to a second band with available storage space; and merging the updated data with the original data. The system can mark as invalid a corresponding portion of the original data of the first band, and subsequently merge the updated data with the original data based on a detected condition, such as a time interval or available storage space in the second band.

The system can further assign the bands of the SMR device into "groups." For example, the first band may be part of a first group which stores new data or data which is written in sequential blocks only, while the second band may be part of a second group which stores updates corresponding to data already stored in the first group. Alternatively, rather than assigning or reserving a second group of bands to store the appended updates, the system can use a spare sector area of the device for storing the appended updates.

Thus, the embodiments described herein provide a system which improves the efficiency of a storage system, where the improvements are fundamentally technological. The improved efficiency can include an improved performance in latency for completion of a write operation. The system provides a technological solution (i.e., a storage system which facilitates rearranging a write operation in a shingled magnetic recording device by appending updates corresponding to original data to a band other than the band storing the original data, and subsequently merging the updated data with the original data) to the technological problem of reducing latency in a write operation in an SMR drive with overlapping tracks, improving both the Quality of Service (QoS) and the overall efficiency of the system.

The terms "storage server," "storage device," and "storage system" refer to a server, device, or system which can include multiple drives and multiple memory modules or components.

The term "drive" refers to a hard drive in a storage system, such as a solid state drive (SDD) or a hard disk drive (HDD).

The term "shingled magnetic recording" or "SMR" memory or device refers to technology which stores data on overlapping tracks in a band. SMR is a type of non-volatile memory for long-term persistent computer storage. SMR can include multiple bands, which can each include multiple overlapping tracks.

The terms "controller module" and "controller" refer to a module located in a storage server, and may be used interchangeably. In the embodiments described herein, the controller is situated in the drive between the non-volatile memory and a requesting host. The controller can include a data buffer, into which data is written for temporary storage, e.g., accumulated new data associated with write operations.

Exemplary Environment

FIG. 1A illustrates an exemplary environment 100 that facilitates a write operation in a shingled magnetic recording device, in accordance with an embodiment of the present application. Environment 100 can include a computing device 102 which is associated with a user 104. Computing device 102 can include, for example, a tablet, a mobile phone, an electronic reader, a laptop computer, a desktop computer, or any other computing device. Computing device 102 can communicate via a network 110 with servers 112, 114, and 116, which can be part of a distributed storage system. Servers 112-116 can include a storage server, which can include a CPU, an interface card, and storage devices or modules. For example, server 116 can include a CPU 122, a network interface card (NIC) 124, and hard disk drives (HDDs) 132, 136, and 140, where each HDD can have, respectively, its own controller 134, 138, and 142. An HDD can include non-volatile memory, including multiple non-volatile memory modules or components such as shingle magnetic recording (SMR). SMR can include multiple bands, where a band can include multiple overlapping tracks.

For example, HDD 140 can include shingled magnetic recording memory in a group 160, including multiple bands 144, 146, 148, and 150. Band 144 can include tracks 144.1-144.m; band 146 can include tracks 146.1-146.n; band 148 can include tracks 148.1-148.p; and band 150 can include tracks 150.1-150.q. Note that the tracks included in bands 144-150 are overlapping tracks, as depicted below in relation to FIG. 1C.

Data can be written to an SMR band in a sequential manner without affecting the overlapping neighboring tracks. For example, data may be written to band 144 in a sequential manner starting from track 144.1 and moving sequentially to track 144.2, etc. However, performing a random write (i.e., writing data out of sequential order) may require the system to read out, modify, and write back an entire band, where the random write may only be a small update in comparison to the size of the band. For example, band 144 can have a band size of 256 MB, where all of tracks 144.1-144.m store data (e.g., there is little or no available storage space on band 144). In order to perform a random write for a small update of 4 KB to the middle of track 144.2 (e.g., when the next sequentially available storage is on track 144.m or there is no available storage space on tracks 144.1-144.m), the system must read out all the data currently stored on tracks 144.1-144.m of band 144, update the 4 KB portion corresponding to the data on track 144.2, and write back the entirety of the 256 MB updated band 144. Thus, performing a random write in a shingled magnetic recording device with overlapping tracks can result in a high write amplification, which can decrease the efficiency of the system.

FIG. 1B illustrates the placement of tracks in a conventional band 170, in accordance with the prior art. Band 170 can include multiple tracks, such as tracks 172.1-172.4, which are arranged in a non-overlapping manner. This allows the system to perform a random write operation to a block 174 of track 172.2 without affecting any of the neighboring or adjacent tracks.

FIG. 1C illustrates an exemplary shingled magnetic recording 180 on an HDD 140, in accordance with an embodiment of the present application. SMR 180 can be a "platter" which includes multiple bands, including bands 144, 146, 148, and 150. SMR 180 can also include isolation areas between each pair of neighboring bands, e.g., isolation area 182 between band 148 and 150. These isolation areas allow operations to be performed on a band without affecting the neighboring bands.

Each band includes multiple overlapping tracks. For example, band 150 includes multiple tracks 150.1-150.q (as shown in FIG. 1A). In FIG. 1C, a portion of band 150 is depicted as including tracks 150.1-150.4, each of which is depicted as including a portion which overlaps with its neighboring track or tracks. Given the overlapping tracks in the bands of SMR 180, a random write operation to a block 184 of track 150.2 can affect neighboring tracks 150.1 and 150.3. Block 184 includes physical space in memory which includes overlapping portion 186 (shared by tracks 150.2 and 150.3), non-overlapping portion 188 (which is unique to track 150.2), and overlapping portion 190 (shared by tracks 150.1 and 150.2). Thus, in order to perform a random write (e.g., an update to original data stored on track 150.2 in block 184), the system must read out the data currently stored on all of tracks 150.1-150.q, modify the portion corresponding to block 184 on track 150.2, and write back the entirety of the modified data to band 150 (or another band). The write amplification involved with such a random write operation can decrease the efficiency of the system, as described above in relation to FIG. 1A.

The embodiments described herein solve the problem of increasing the efficiency of performing a random write operation in a shingled magnetic recording device by rearranging a write operation. A general data flow and architecture is described below in relation to FIGS. 2 and 3, while an exemplary write operation is described below in relation to FIGS. 4A and 4B.

Figure 2:
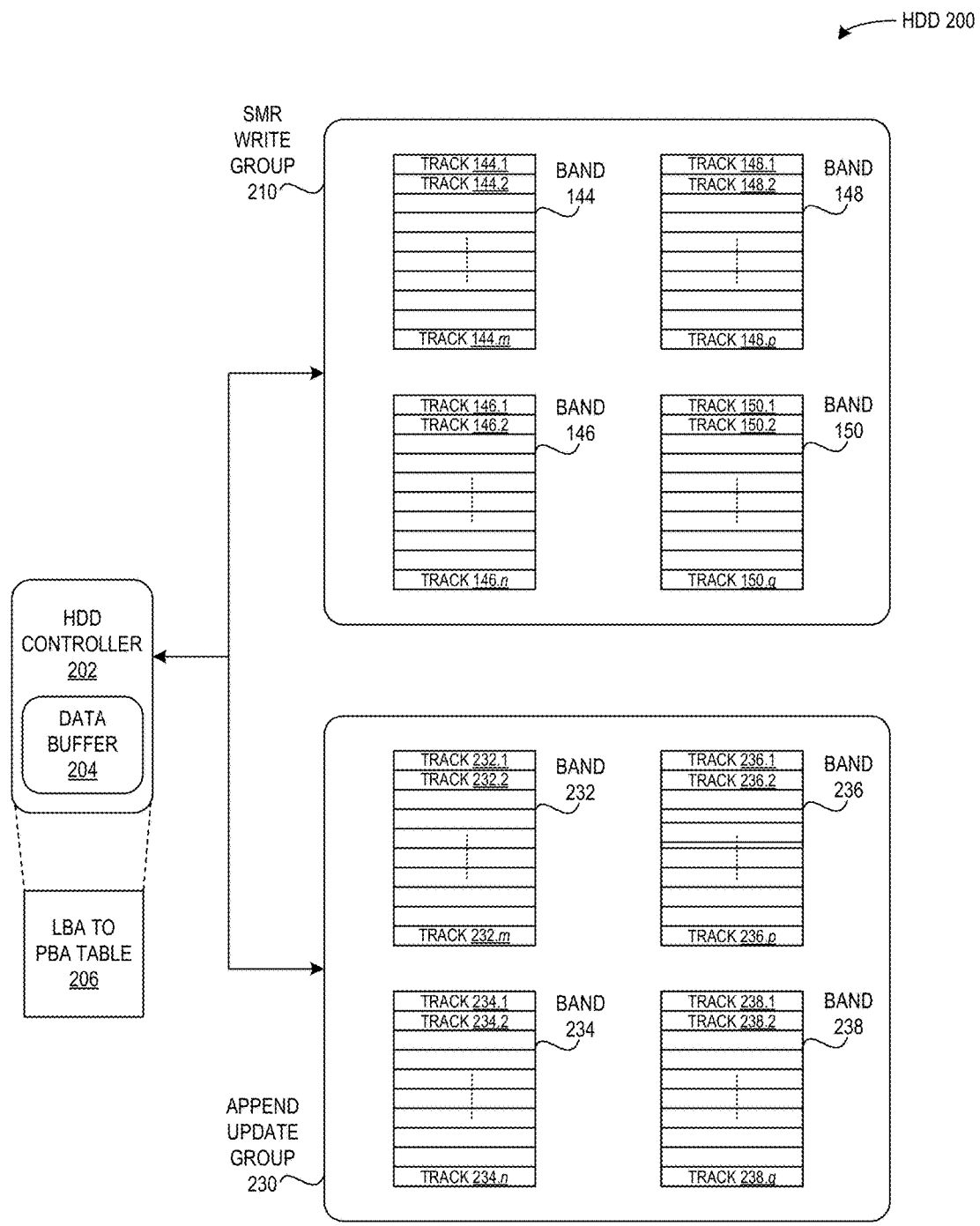
FIG. 2 illustrates an exemplary HDD for facilitating a write operation in a shingled magnetic recording device, including a write group and an append group, in accordance with an embodiment of the present application.

Exemplary HDD and Architecture with Separate Groups of SMR Bands and a Shared Free Band Pool FIG. 2 illustrates an exemplary HDD 200 for facilitating a write operation in a shingled magnetic recording device, including an SMR write group 210 and an append update group 230, in accordance with an embodiment of the present application. HDD 200 is a storage device with a plurality of band with overlapping tracks for storing data, and a controller module. The plurality of bands can include a first group of bands and a second group of bands, wherein new data is written to the first group, and wherein updated data corresponding to data stored in the first group is written to the second group. The controller module can be configured to: receive a request to write first data; in response to determining that the first data is updated data corresponding to original data stored in a first band, append the updated data to a second band with available storage space; and merge the updated data with the original data.

Specifically, HDD 200 can include an HDD controller 202 with a data buffer 204 and an LBA to PBA table 206. HDD controller 202 can communicate with SMR write group 210 and append update group 230. SMR write group 210 can include bands 144-150, similar to group 160 of FIG. 1A. Append update group 230 can include bands 232, 234, 236, and 238. Band 232 can include tracks 232.1-232.$m$; band 234 can include tracks 234.1-234.$n$; band 236 can include tracks 236.1-236.$p$; and band 238 can include tracks 238.1-238.$q$.

During operation, HDD 200 can receive via HDD controller 202 a request to write data. HDD controller 202 can check its LBA to PBA table 206 to determine if the data to be written is "new data" or "updated data." If the data to be written is new data (i.e., is not an update to data already stored in a band of group 210), HDD controller 202 can accumulate the data in data buffer 204. When the accumulated data in data buffer 204 reaches a size sufficient to fill a band, controller 202 can determine an open band in group 210, and write the accumulated data to the open band (as described below in relation to FIGS. 3, 4A, and 4B).

If the data to be written is updated data (i.e., an update to data already stored in a band of group 160), controller 142 can determine an open band (i.e., a band with available storage space) in group 230 on which to store the updated data. The updated data can be written and appended beginning from a first sequentially available location on a track in one of bands 232-238.

Thus, HDD 200 illustrates how separating the bands of a shingled magnetic recording device into two separate groups (SMR write group 210 for new data and append update group 230 for updated data) allows all host data to be converted into a sequential write, which can avoid the inefficiencies associated with performing a random write operation on an SMR device.

Figure 3:
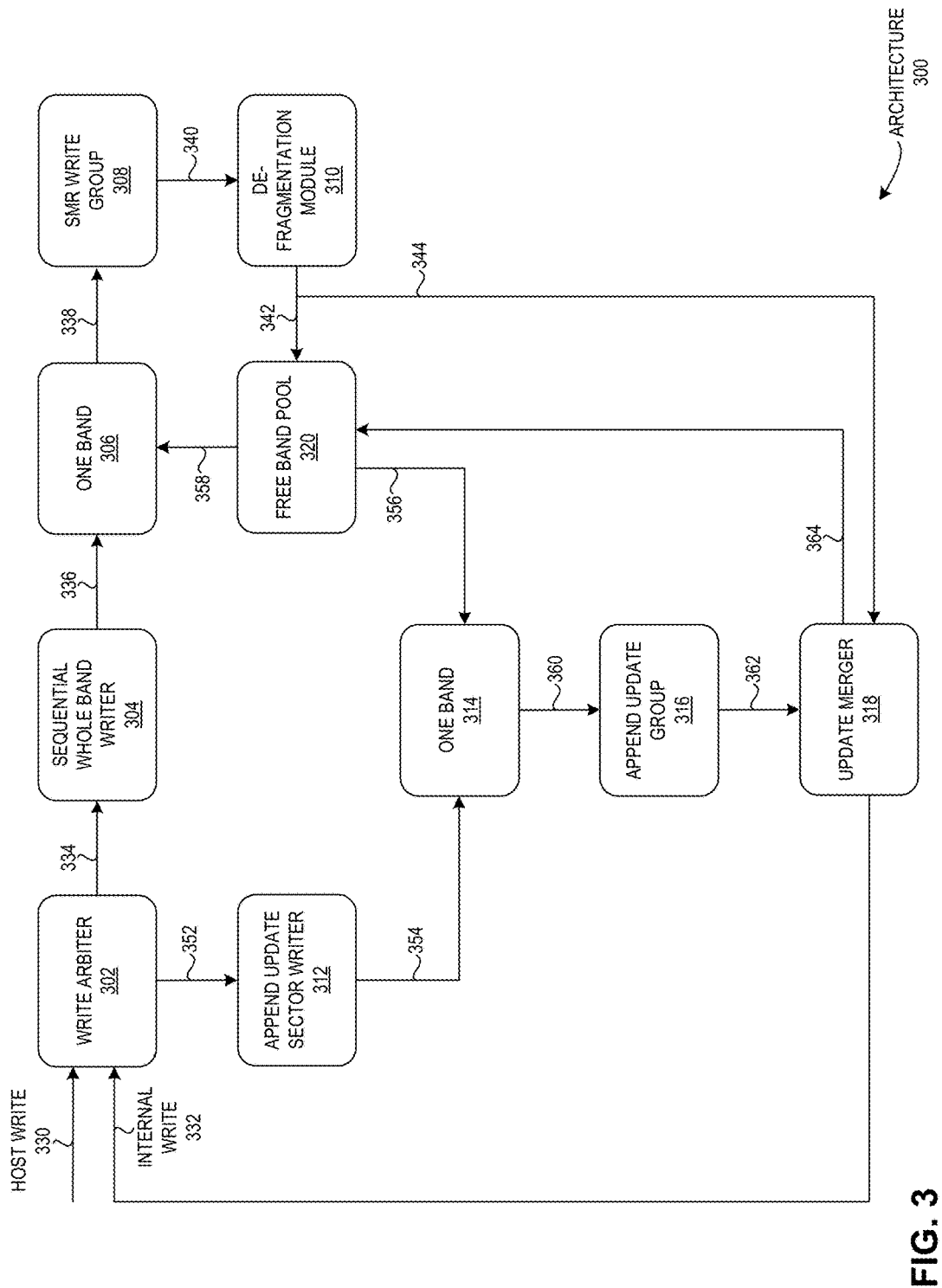
FIG. 3 illustrates an exemplary architecture for facilitating a write operation in a shingled magnetic recording device, including a shared free band pool, in accordance with an embodiment of the present application.

FIG. 3 illustrates an exemplary architecture 300 for facilitating a write operation in a shingled magnetic recording device, including a shared free band pool, in accordance with an embodiment of the present application. During operation, the system can receive, via a write arbiter 302, a host write 330 request or an internal write 332 request. Host write 330 can be a request from an external host to write data to memory, while internal write 332 can be a request to write data received from an internal module or component within an SMR device or HDD. Host write 330 may be assigned a higher priority than internal write 332, which allows internal write 332 to perform as a background process.

Write arbiter 302 can determine whether the data of host write 330 or internal write 332 is new data to be written or an update to existing stored data. If the data is new data to be written, write arbiter 302 can send the data (via a communication 334) to a sequential whole band writer 304, which accumulates new data until data sufficient to fill an entire band is accumulated (e.g., stored in a data buffer). Sequential whole band writer 304 can send the data (via a communication 336) to a one band 306 module, where one band 306 can be assigned or obtained as needed (via a communication 358) from a free band pool 320. One band 306 may be marked for or indicated as belonging to an SMR write group 308 (via a communication 338). SMR write group 308 is similar to SMR write group 160 of FIG. 2.

One band 306 may include portions which are marked as invalid, i.e., portions corresponding to updated data stored in another band (as described above in relation to update group 230 of FIG. 2). SMR write group 308 can send (via a communication 340) full bands (i.e., one band 306) to defragmentation module 310, which can in turn delete certain portions marked as invalid and move remaining valid fragments of bands together. Defragmentation module 310 can subsequently release any free bands (via a communication 342) back to free band pool 320. Additionally, defragmentation module 310 can send the valid fragments of the bands to an update merger 318 module (via a communication 344).

Returning to write arbiter 302, if the request (330 or 332) is not new data to be written (i.e., is an update to existing stored data), write arbiter 302 can send the data (via a communication 352) to an append update sector writer 312, which determines an open one band 314 and appends the updated data to one band 314. One band 314 can be assigned or obtained as needed (via a communication 356) from free band pool 320. One band 314 may be marked for or indicated as belonging to an append update group 316 (via a communication 360). Append update group 316 is similar to append update group 230 of FIG. 2. Append update group 316 can send the updated portions of the bands to update merger 318 (via a communication 362).

Upon receiving communication 344 (indicating the original valid fragments from defragmentation module 310) and communication 362 (indicating the updated portions corresponding to the original valid fragments), update merger 318 can begin an internal write procedure, by periodically merging accumulated portions of the original band with the corresponding updates. For example, update merger 318 can read out the original band (i.e., the defragmented and valid portions of one band 306 of SMR write group 308), modify the original band with the updated portions (i.e., as indicated from one band 314 of append update group 316), and write the modified band back to one band 306 (or to another band, as determined by the system via write arbiter 302 and sequential whole band writer 304). Update merger 318 can also update the mapping of the logical block address for the data to a physical block address of the SMR device or memory, and release any free pools back to free band pool 320 (via a communication 364).

Thus, embodiments of the present invention provide a system which improves the efficiency of performing a random write by distinguishing between new data and updated data, and separating the SMR bands into specific groups for new data and updated data. The system can also achieve a reduction in the total cost of operation (TCO) by providing an efficient method for maintaining a sequential write using the high-density, high-capacity SMR.

Exemplary Write Operation Using a Shared Free Band Pool

Figure 4A:
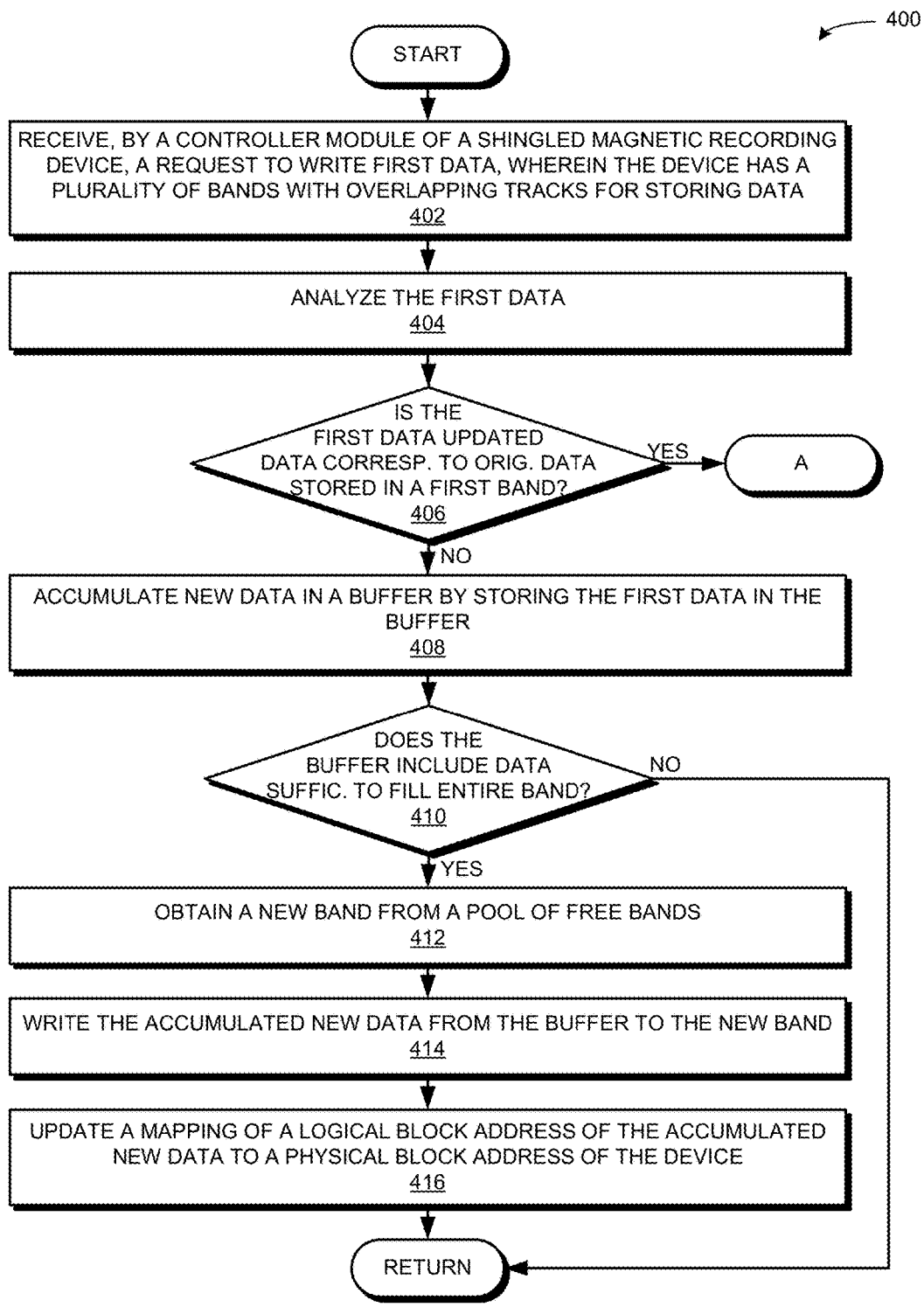
FIG. 4A presents a flowchart illustrating a method for writing data using a shared free band pool, in accordance with an embodiment of the present application.

FIG. 4A presents a flowchart 400 illustrating a method for writing data using a shared free band pool, in accordance with an embodiment of the present application. During operation, the system receives, by a controller module of a shingled magnetic recording device, a request to write first data, wherein the device has a plurality of bands with overlapping tracks for storing data (operation 402). The system analyzes the first data (operation 404). If the first data is updated data corresponding to original data stored in a first band (decision 406), the operation continues as described at Label A of FIG. 4B.

If the first data is not updated data corresponding to data stored in a first band (or any band) (decision 406), the system accumulates new data in a buffer by storing the first data in the buffer (operation 408). If the buffer includes data sufficient to fill an entire band (decision 410), the system obtains a new band from a pool of free bands (operation 412). In some embodiments, the system can determine to obtain a new band when the accumulated new data in the buffer reaches a predetermined size. The system writes the accumulated new data from the buffer to the new band (operation 414), and updates a mapping of a logical block address of the accumulated new data to a physical block address of the device (operation 416). If the buffer does not include data sufficient to fill the entire band (decision 410), the system updates a mapping of a logical block address of the accumulated new data to a physical block address of the device (operation 416).

Figure 4B:
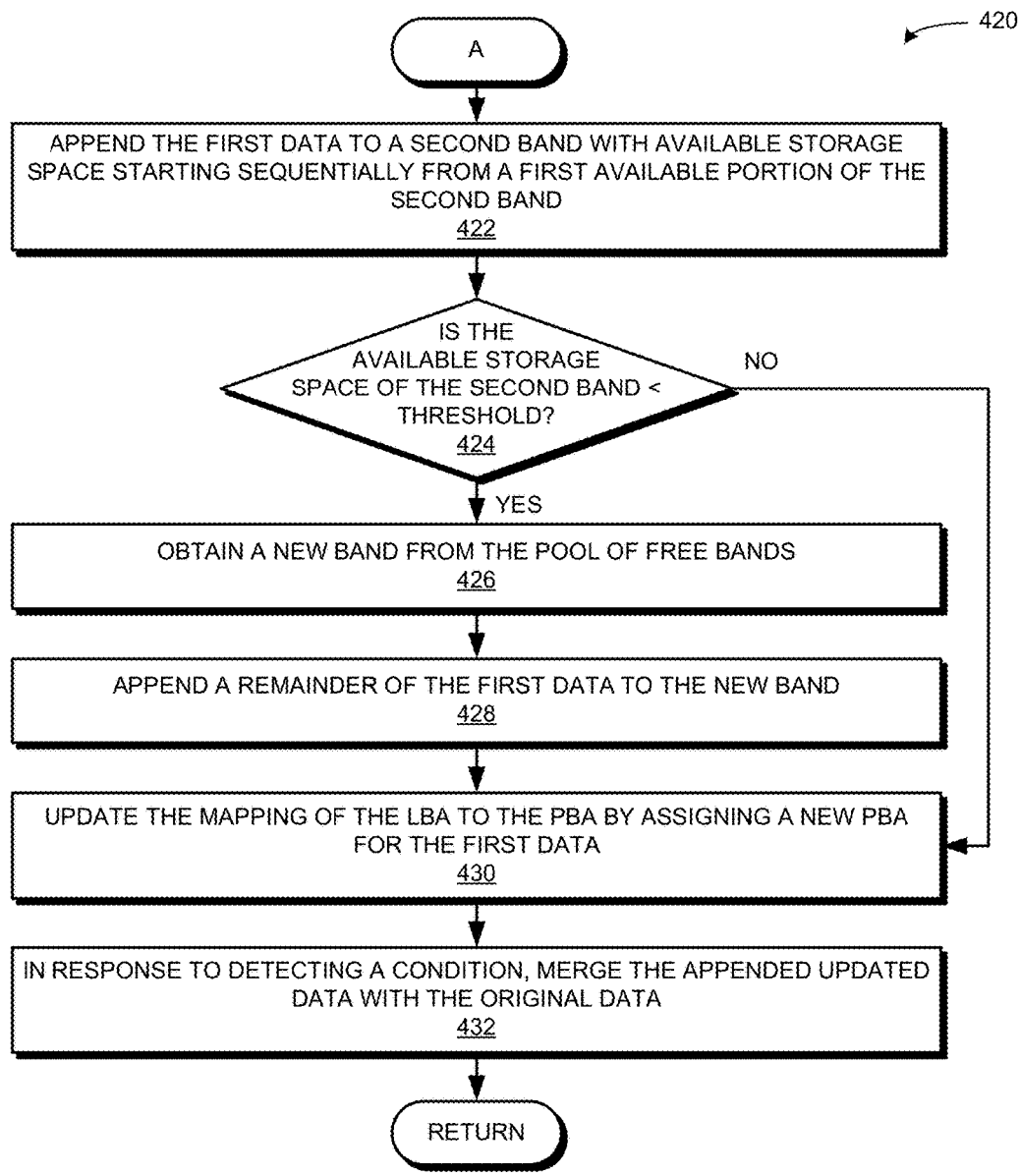
FIG. 4B presents a flowchart illustrating a method for writing data using a shared free band pool, in accordance with an embodiment of the present application.

FIG. 4B presents a flowchart 420 illustrating a method for writing data using a shared free band pool, in accordance with an embodiment of the present application. During operation, the system appends the first data (e.g., the updated data) to a second band with available storage space starting sequentially from a first available portion of the second band (operation 422). The system can determine the second band by selecting from a reserved group (e.g., append update group 230 in FIG. 2) or by using any "open" band with available storage space. In some embodiments, the system writes to the same band on which the original data is stored.

If the available storage space of the second band is below a predetermined threshold (decision 424), the system obtains a new band from the pool of free bands (operation 426). The system appends a remainder of the first data to the new band (operation 428) (e.g., starting sequentially from the beginning of the new band). The system updates a mapping of the LBA to the PBA by assigning a new PBA for the first data (operation 430). In response to detecting a condition, the system merges the appended updated data with the original data (operation 432), as described further below in relation to FIG. 8.

Exemplary HDD and Architecture with a Spare Sector Pool

In some embodiments, the system does not reserve a group of bands for storing the appended updates (e.g., append update group 230 of FIG. 2). Instead, the system can use a spare sector region of the SMR HDD. The spare sector region is built into the HDD and typically used to handle media and other errors. Because spare sectors in this manufacture-allotted region are generally used on a gradual basis, the embodiments described herein can use the spare sectors to temporarily store the appended updates. This may occur when the capacity of the SMR bands are full, nearing capacity, or reaching a predetermined available threshold.

Figure 5:
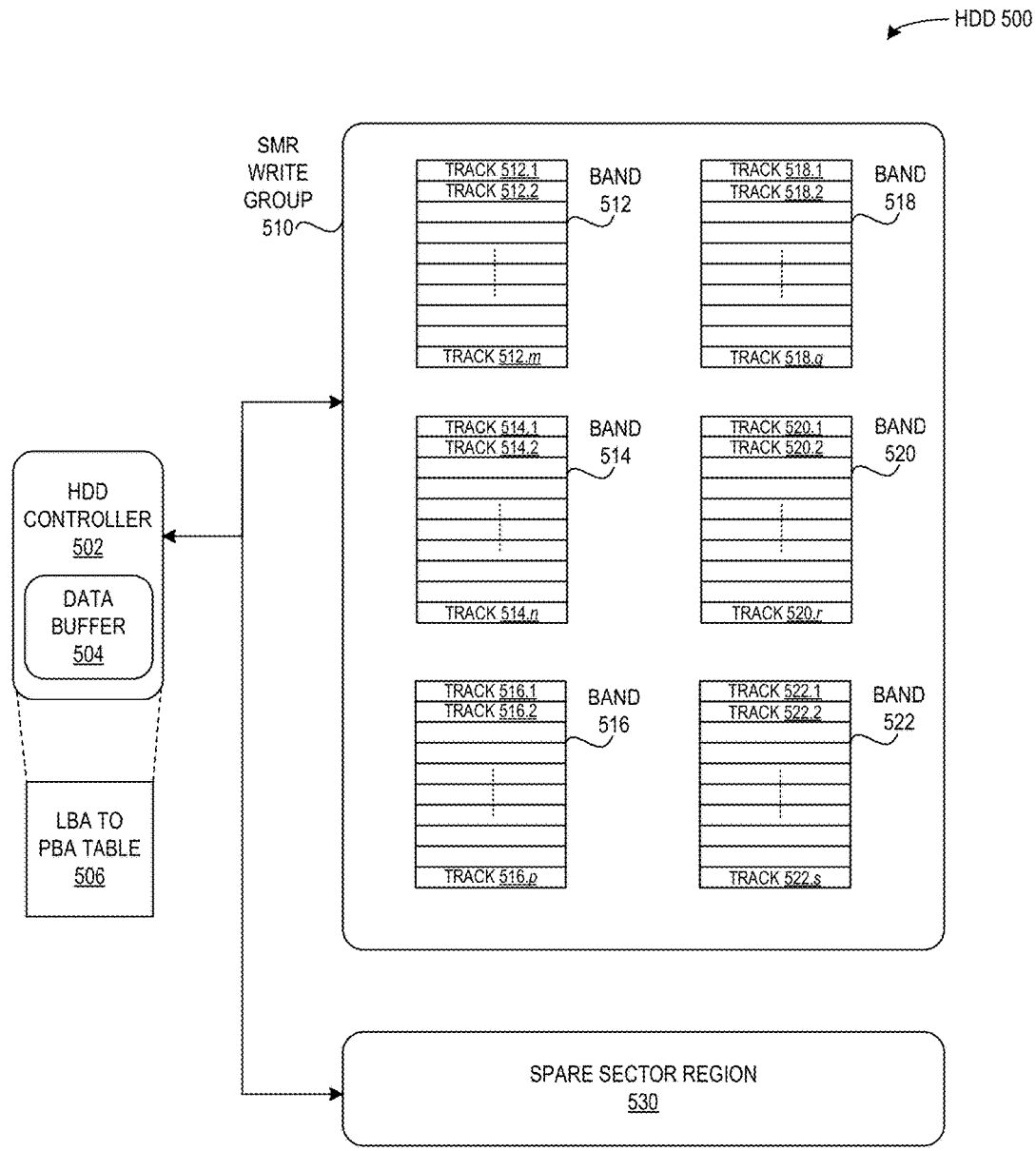
FIG. 5 illustrates an exemplary HDD for facilitating a write operation in a shingled magnetic recording device, including a write group and a spare sector region, in accordance with an embodiment of the present application.

FIG. 5 illustrates an exemplary HDD 500 for facilitating a write operation in a shingled magnetic recording device, including an SMR write group 510 and a spare sector region 530, in accordance with an embodiment of the present application. HDD 500 can include an HDD controller 502 with a data buffer 504 and an LBA to PBA table 506. HDD controller 502 can communicate with SMR write group 510 and spare sector region 530. SMR write group 210 can include bands 512, 514, 516, 518, 520, and 522. Band 512 can include tracks 512.1-512.*m*; band 514 can include tracks 514.1-514.*n*; band 516 can include tracks 516.1-516.*p*; band 518 can include tracks 518.1-518.*q*; band 520 can include tracks 520.1-520.*r*; and band 522 can include tracks 522.1-522.*s*.

During operation, HDD 500 can receive via HDD controller 502 a request to write data. HDD controller 502 can check its LBA to PBA table 506 to determine if the data to be written is new data or updated data. If the data to be written is new data, HDD controller 502 can accumulate the data in data buffer 504. When the accumulated data in data buffer 504 reaches a size sufficient to fill a band (or a predetermined size), controller 502 can determine an open band in group 510, and write the accumulated data to the open band. If the data to be written is updated data, controller 502 can determine a spare sector from spare sector region 530, allocate the spare sector, and write the data to the allocated spare sector. The system can also update LBA to PBA table as needed.

Thus, HDD 500 illustrates how the system can rely on a spare sector region when the SMR bands are full or reaching a certain threshold. This allows all host data to be converted into a sequential write, thereby avoiding the inefficiencies associated with performing a random write operation on an SMR device.

Figure 6:
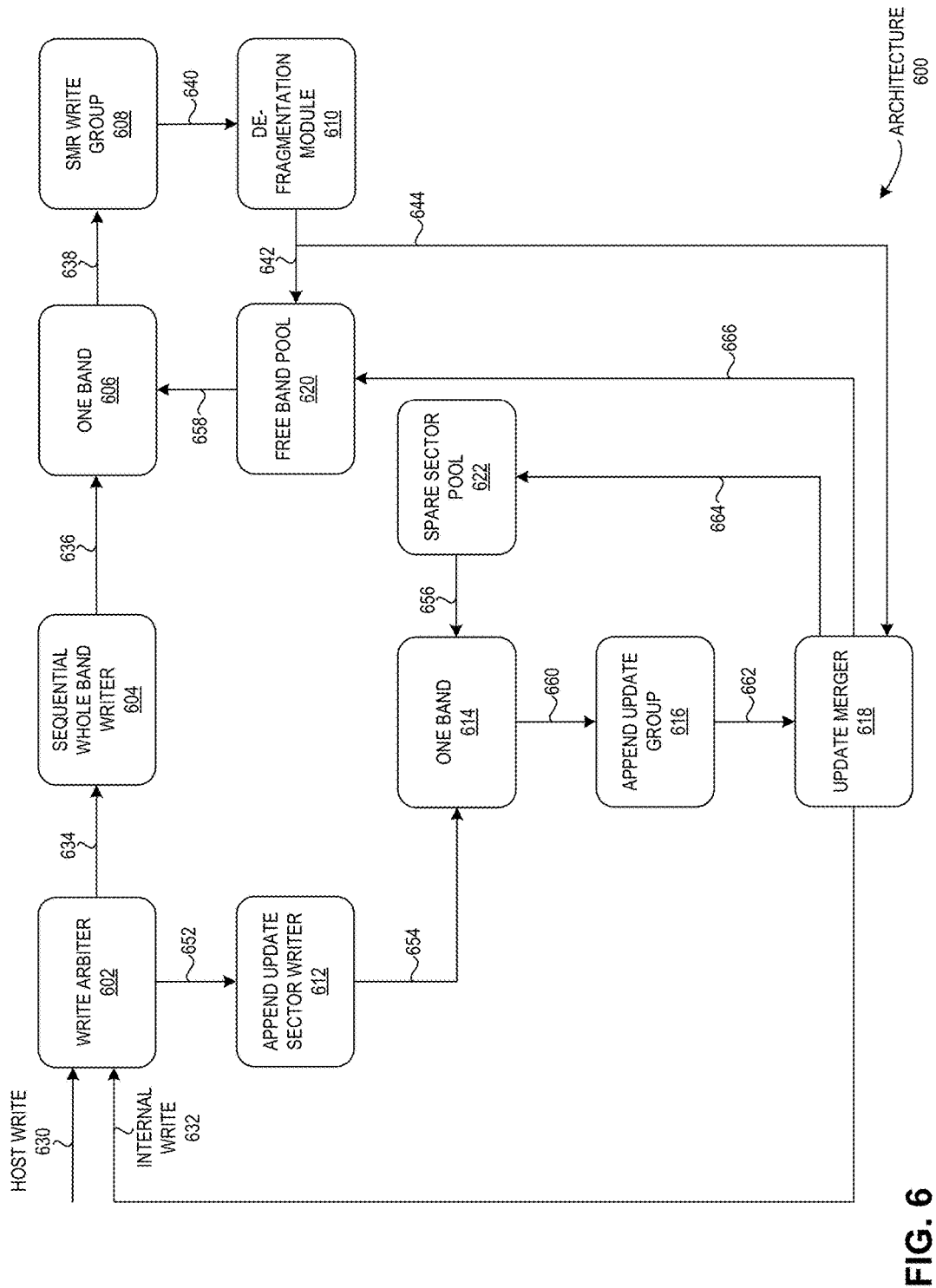
FIG. 6 illustrates an exemplary architecture for facilitating a write operation in a shingled magnetic recording device, including a free band pool and a spare sector pool, in accordance with an embodiment of the present application.

FIG. 6 illustrates an exemplary architecture 600 for facilitating a write operation in a shingled magnetic recording device, including a free band pool and a spare sector pool, in accordance with an embodiment of the present application. Architecture 600 is similar to architecture 300, with some differences noted below. During operation, the system can receive, via a write arbiter 602, a host write 630 request or an internal write 632 request (both of which can indicate "received data"). Write arbiter 602 can determine whether the received data is new data to be written or an update to existing stored data. If the received data is new data to be written, the data flow proceeds as described above for architecture 300 (via communications 634, 636, 638, 640, 642, and 658, to/from modules 604, 606, 608, 610, and 620).

If the received data is not new data to be written (i.e., is an update to existing stored data), write arbiter 602 can send the data (via a communication 652) to an append update sector writer 612, which determines an open one band 614 and appends the updated data to one band 614. In contrast to one band 314 of architecture 300, one band 614 can be assigned or obtained as needed (via a communication 656) from a spare sector pool 622. One band 614 may be marked for or indicated as belonging to an append update group 616 (via a communication 660). Append update group 316 can send the updated portions of the bands to an update merger 618 module (via a communication 662).

Similar to update merger 318 of architecture, update merger 618 can begin an internal write procedure by periodically merging accumulated (and defragmented) portions of the original band (via a communication 644) with the corresponding updates (via a communication 662). In addition to the merging steps previously described for update merger module 318, including releasing any free pools back to the free band pool (via a communication 666), update merger 618 can release any free sectors back to spare sector pool 622.

Exemplary Write Operation Using a Spare Sector Pool

Figure 7A:
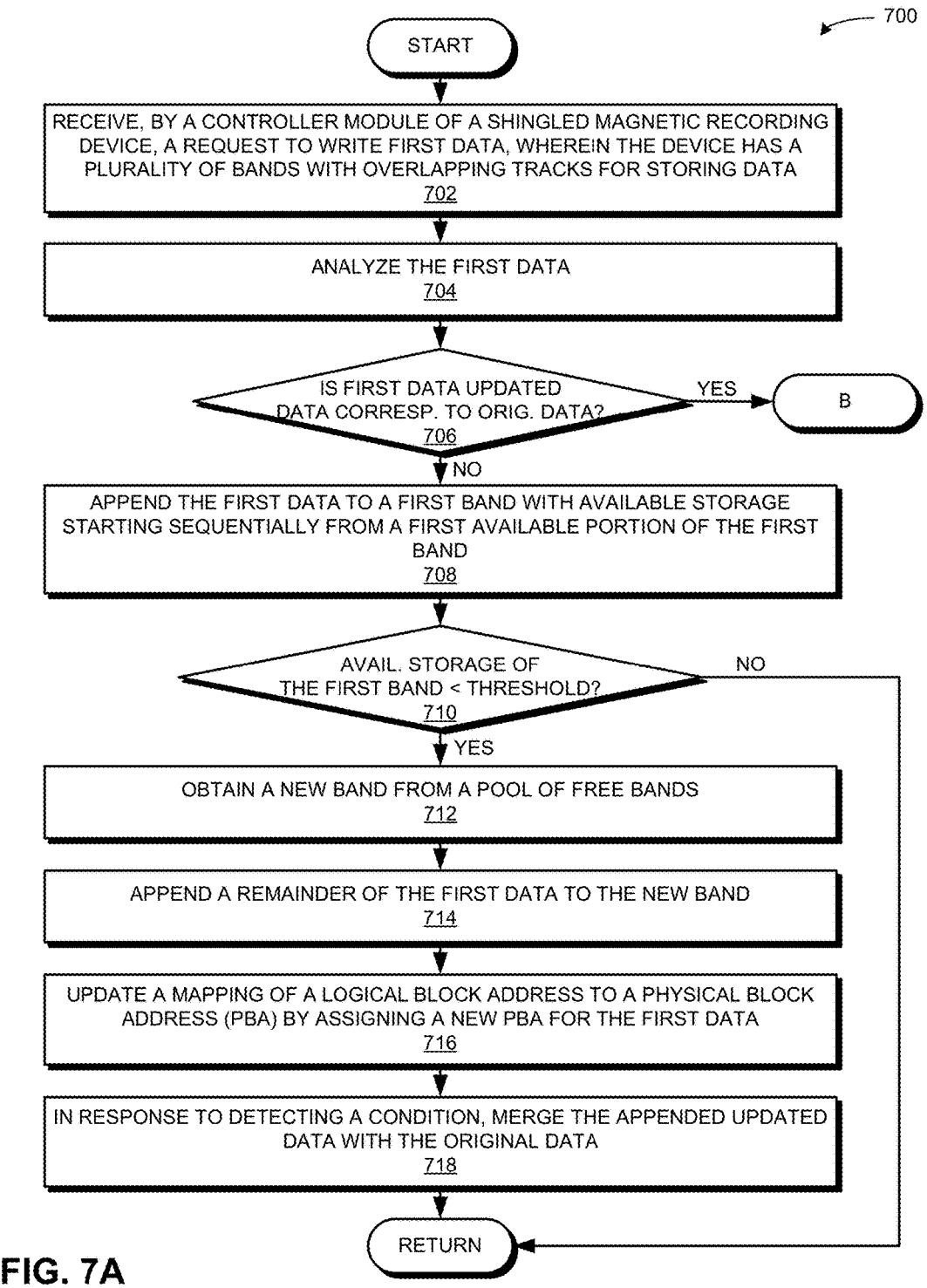
FIG. 7A presents a flowchart illustrating a method for writing data using a shared free band pool and a spare sector pool, in accordance with an embodiment of the present application.

FIG. 7A presents a flowchart 700 illustrating a method for writing data using a shared free band pool and a spare sector pool, in accordance with an embodiment of the present application. During operation, the system receives, by a controller module of a shingled magnetic recording device, a request to write first data, wherein the device has a plurality of bands with overlapping tracks for storing data (operation 702). The system analyzes the first data (operation 704). If the first data is updated data corresponding to original data stored in a first band (decision 406), the operation continues as described at Label B of FIG. 7B.

If the first data is not updated data corresponding to data stored in a first band (or any band) (decision 706), the system appends the first data (e.g., the updated data) to a first band with available storage space starting sequentially from a first available portion of the first band (operation 708). The system can determine the first band by selecting any "open" band with available storage space. In some embodiments, the system writes to the same band on which the original data is stored.

If the available storage space of the first band is below a predetermined threshold (decision 710), the system obtains a new band from a pool of free bands (operation 712). The system appends a remainder of the first data to the new band (operation 714) (e.g., starting sequentially from the beginning of the new band). The system updates a mapping of the logical block address to the physical block address (PBA) by assigning a new PBA for the first data (operation 716). In response to detecting a condition, the system merges the appended updated data with the original data (operation 718), as described further below in relation to FIG. 8.

Figure 7B:
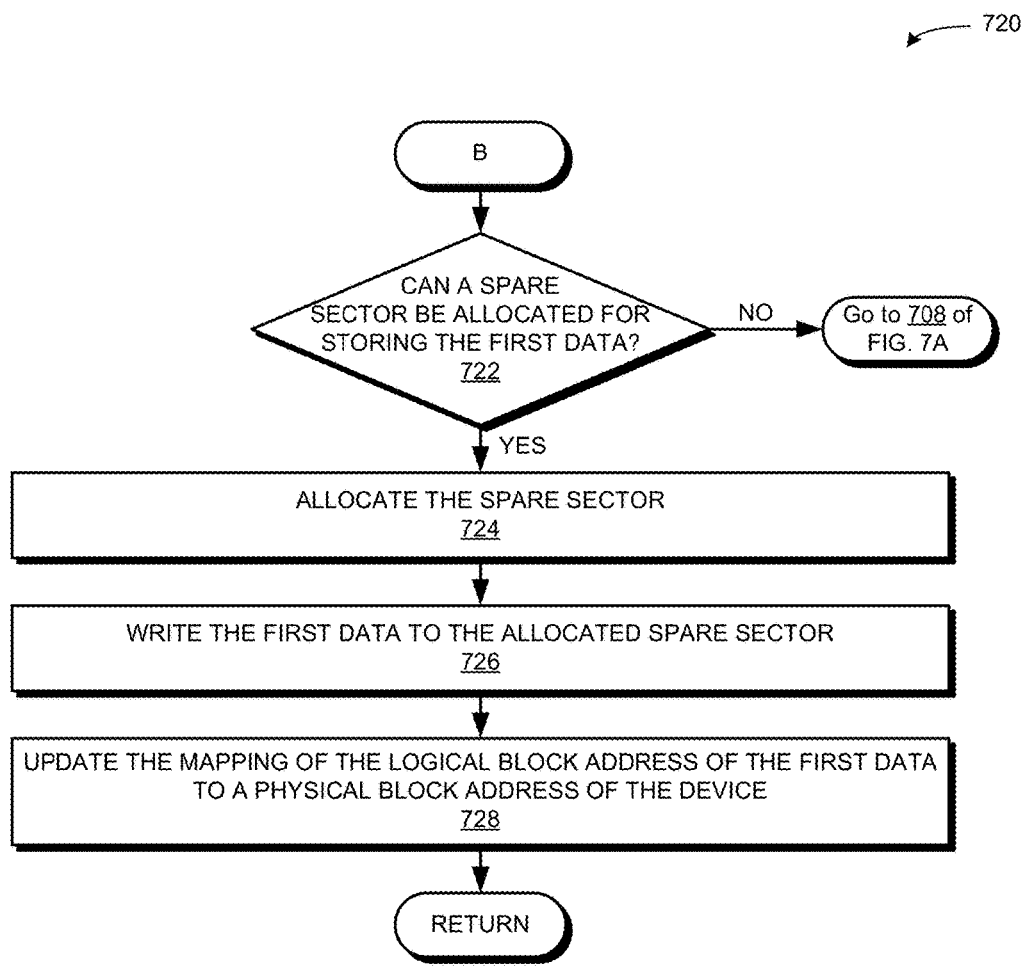
FIG. 7B presents a flowchart illustrating a method for writing data using a shared free band pool and a spare sector pool, in accordance with an embodiment of the present application.

FIG. 7B presents a flowchart 720 illustrating a method for writing data using a shared free band pool and a spare sector pool, in accordance with an embodiment of the present application. The system determines if a spare sector can be allocated for storing the first data (decision 722). If not, the operation continues as described at operation 708 of FIG. 7A. If the system can allocate a spare sector (decision 722), the system allocates the spare sector (operation 724) and writes the first data to the allocated spare sector (operation 726). The system updates the mapping of the logical block address for the first data to a physical block address of the device (operation 728).

Performing a Merge Operation

Figure 8:
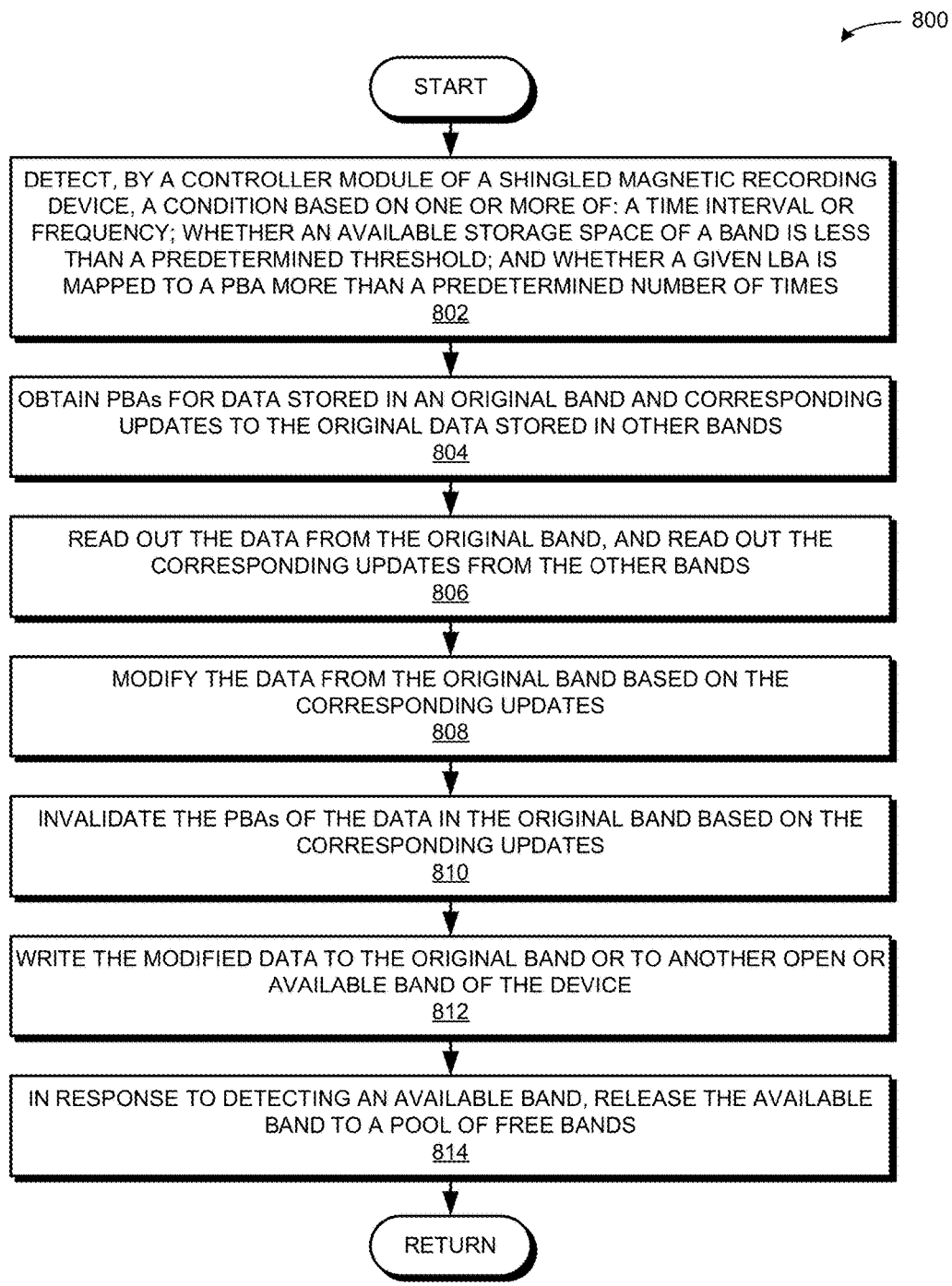
FIG. 8 presents a flowchart illustrating a method for performing a merge operation, in accordance with an embodiment of the present application.

FIG. 8 presents a flowchart 800 illustrating a method for performing a merge operation, in accordance with an embodiment of the present application. During operation, the system detects, by a controller module of a shingled magnetic recording device, a condition based on one or more of: a time interval or frequency; whether an available storage space of a band (e.g., a band with appended updates) is less than a predetermined threshold; and whether a given LBA is mapped to a PBA more than a predetermined number of times (operation 802). The system obtains PBAs for data stored in an original band and corresponding updates to the original data stored in other bands (operation 804). The system reads out the data from the original band, and reads out the corresponding updates from the other bands (operation 806). The system modifies the data from the original band based on the corresponding updates (operation 808). The system can also invalidate the PBAs of the data in the original band based on the corresponding updates (operation 810). Note that operation 810 can also occur in a different order, e.g., as performed by defragmentation module 310 of FIG. 3. The system can write the modified data to the original band or to another open or available band of the SMR device (operation 812). In response to detecting an available band, the system can release the available band to a pool of free bands (operation 814). In some embodiments, the system can release an available sector to a spare sector pool, as described above in relation to FIG. 6.

Exemplary Computer System and Apparatus

Figure 9:
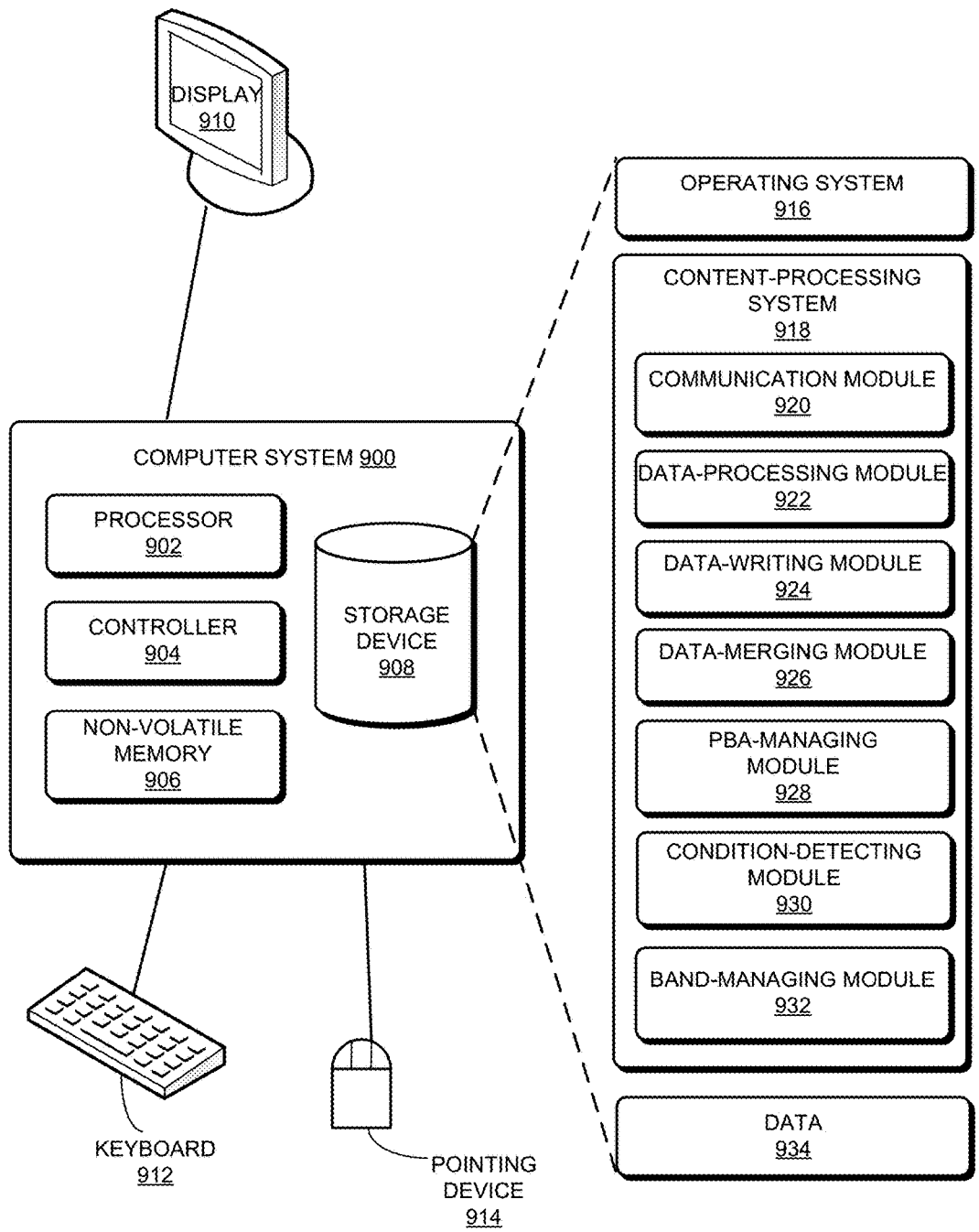
FIG. 9 illustrates an exemplary computer system that facilitates a write operation in a shingled magnetic recording device, in accordance with an embodiment of the present application.

FIG. 9 illustrates an exemplary computer system 900 that facilitates a write operation in a shingled magnetic recording device, in accordance with an embodiment of the present application. Computer system 900 includes a processor 902, a controller 905, a non-volatile memory 906, and a storage device 908. Computer system 900 may also include volatile memory (not shown) which can include, e.g., RAM, that serves as a managed memory, and can be used to store one or more memory pools. Non-volatile memory 906 can include persistent storage, e.g., shingled magnetic recording with a plurality of bands with overlapping tracks, accessed via controller 904. Furthermore, computer system 900 can be coupled to a display device 910, a keyboard 912, and a pointing device 914. Storage device 908 can store an operating system 916, a content-processing system 918, and data 934.

Content-processing system 918 can include instructions, which when executed by computer system 900, can cause computer system 900 to perform methods and/or processes described in this disclosure. Specifically, content-processing system 918 can include instructions for receiving and transmitting data packets, including a request to write or read data, and data to be processed and stored. Content-processing system 918 can further include instructions for receiving, by a controller module of the device, a request to write first data (communication module 920). Content-processing system 918 can further include instructions for, in response to determining that the first data is updated data corresponding to original data stored in a first band (data-processing module 922), appending the updated data to a second band with available storage space (data-writing module 924). Content-processing system 918 can further include instructions for merging the updated data with the original data (data-merging module 926).

Content-processing system 918 can further include instructions for detecting a condition to merge the updated data (condition-detecting module 930). Content-processing system 918 can further include instructions for, in response to determining that the available storage space of the second band is less than a predetermined threshold (band-managing module 932): obtaining a new band from a pool of free bands (band-managing module 932); and appending a remainder of the first data to the new band (data-writing module 924). Content-processing system 918 can further include instructions for updating a mapping of a logical block address of the first data to a physical block address of the device (PBA-managing module 928). Content-processing system 918 can further include instructions for determining that a spare sector may be allocated for storing the first data and allocating the spare sector (band-managing module 932), and further for writing the first data to the allocated spare sector (data-writing module 924).

Data 934 can include any data that is required as input or that is generated as output by the methods and/or processes described in this disclosure. Specifically, data 934 can store at least: a request to read or write data; data to be written, read, stored, or accessed; processed or stored data; a logical block address; a physical block address; new data; updated data; an indicator of a track or a band in SMR, a band in a group in SMR, a group of bands, a reserved group of bands, or a sector; a spare sector pool; a free band pool; appended updated data; an amount of available storage space in a band; a predetermined threshold for an available storage space; an indicator that a portion of stored data is marked as invalid; a defragmentation operation; accumulated data; a data buffer; a condition; and a number of times that an LBA is mapped to a PBA.

Figure 10:
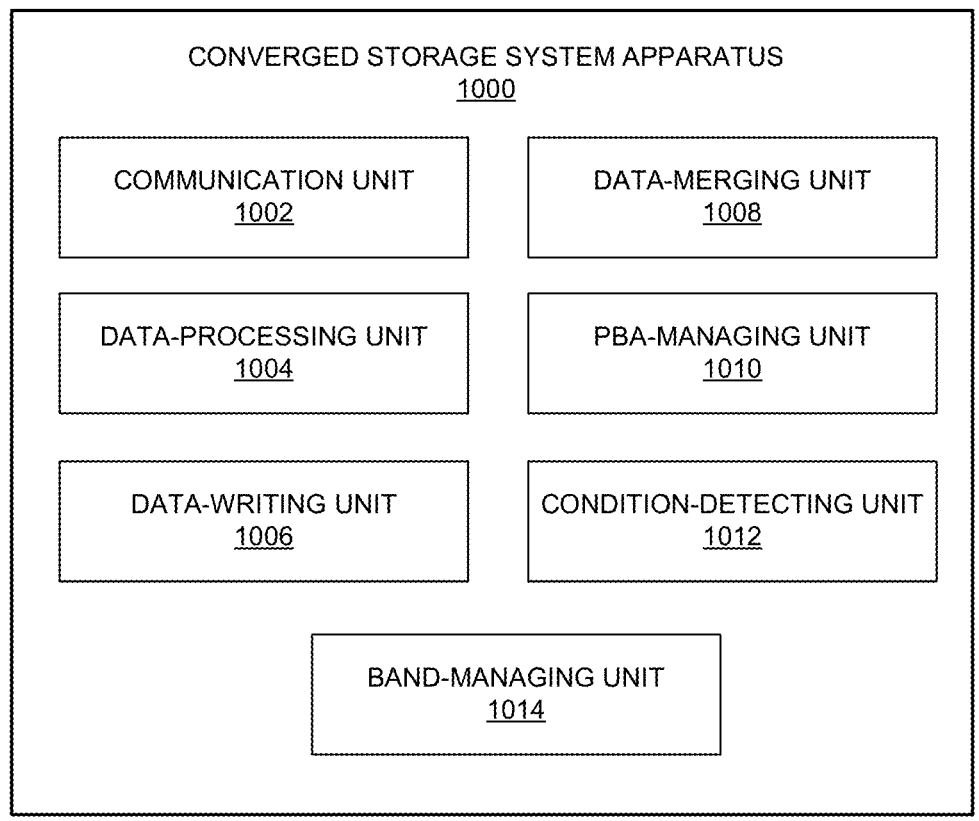
FIG. 10 illustrates an exemplary apparatus that facilitates a write operation in a shingled magnetic recording device, in accordance with an embodiment of the present application.

FIG. 10 illustrates an exemplary apparatus 1000 that facilitates a write operation in a shingled magnetic recording device, in accordance with an embodiment of the present application. Apparatus 1000 can comprise a plurality of units or apparatuses which may communicate with one another via a wired, wireless, quantum light, or electrical communication channel. Apparatus 1000 may be realized using one or more integrated circuits, and may include fewer or more units or apparatuses than those shown in FIG. 10. Further, apparatus 1000 may be integrated in a computer system, or realized as a separate device which is capable of communicating with other computer systems and/or devices. Specifically, apparatus 1000 can comprise units 1002-1014 which perform functions or operations similar to modules 920-932 of computer system 900 of FIG. 9, including: a communication unit 1002; a data-processing unit 1004; a data-writing unit 1006; a data-merging unit 1008; a PBA-managing unit 1010; a condition-detecting unit 1012; and a band-managing unit 1014.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method, comprising:
   receiving, by a controller module of a device, a request to write first data, wherein the device has a plurality of bands with overlapping tracks for storing data;
   in response to determining that the first data is updated data corresponding to original data stored in a first band;
     determining whether an available storage space of a second band is less than a predetermined threshold;
     in response to determining that the available storage space of the second band is not less than the predetermined threshold, appending the updated data to the second band; and
     in response to determining that the available storage space of the second band is less than the predetermined threshold:
       obtaining a new band from a pool of free bands; and
       appending a remainder of the first data to the new band;
   merging the updated data with the original data; and
   updating a mapping of a logical block address of the first data to a physical block address of the device.

2. The method of claim 1, wherein merging the updated data with the original data comprises:
   reading out the original data from the first band;
   modifying the original data based on the updated data appended to the second band; and
   writing back the modified data to the first band or another band.

3. The method of claim 1, wherein merging the updated data with the original data is in response to detecting a condition based on one or more of:
   a time interval or a frequency;
   determining that the available storage space of the second band is less than the predetermined threshold; and
   determining that a logical block address of the first data has been mapped to a physical block address more than a predetermined number of times.

4. The method of claim 1, wherein in response to determining that the first data is updated data corresponding to original data stored in the first band, the method further comprises:
   marking as invalid a corresponding portion of the original data of the first band;
   performing a defragmentation operation based on the marked data; and
   in response to determining an available band based on the defragmentation operation, releasing the available band to the pool of free bands.

5. The method of claim 1, wherein in response to determining that the first data is not updated data corresponding to original data stored in the bands, the method further comprises:
   accumulating new data in a buffer by storing the first data in the buffer; and
   in response to determining that the buffer includes data of a size sufficient to fill an entire band:
     obtaining a second new band from the pool of free bands;
     writing the accumulated data from the buffer to the second new band; and
     updating a mapping of a logical block address of the accumulated new data to a physical block address of the device.

6. The method of claim 1, wherein the updated data is appended to the second band starting sequentially from a first available portion of the second band.

7. The method of claim 1, wherein in response to determining that the first data is updated data corresponding to original data stored in the first band, the method further comprises:
   determining that a spare sector may be allocated for storing the first data:
   allocating the spare sector;
   writing the first data to the allocated spare sector; and
   updating a mapping of a logical block address of the first data to a physical block address of the device.

8. The method of claim 1, wherein the plurality of bands includes a first group of bands and a second group of bands, and
   wherein new data is written to the first group, and wherein updated data corresponding to data stored in the first group is written to the second group.

9. The method of claim 8, wherein the device includes a spare sector area, and
   wherein new data is written to the plurality of bands, and wherein updated data corresponding to data stored in the first group is written to the spare sector area.

10. A computer system, comprising:
a processor; and
a memory coupled to the processor and storing instructions, which when executed by the processor cause the processor to perform a method, the method comprising:
receiving, by a controller module of the system, a request to write first data, wherein the system has a plurality of bands with overlapping tracks for storing data;
in response to determining that the first data is updated data corresponding to original data stored in a first band;
determining whether an available storage space of a second band is less than a predetermined threshold;
in response to determining that the available storage space of the second band is not less than the predetermined threshold, appending the updated data to the second band; and
in response to determining that the available storage space of the second band is less than the predetermined threshold:
obtaining a new band from a pool of free bands; and
appending a remainder of the first data to the new band;
merging the updated data with the original data; and
updating a mapping of a logical block address of the first data to a physical block address of the device.

11. The computer system of claim 10, wherein merging the updated data with the original data comprises:
reading out the original data from the first band;
modifying the original data based on the updated data appended to the second band; and
writing back the modified data to the first band or another band.

12. The computer system of claim 10, wherein merging the updated data with the original data is in response to detecting a condition based on one or more of:
a time interval or a frequency;
determining that the available storage space of the second band is less than the predetermined threshold; and
determining that a logical block address of the first data has been mapped to a physical block address more than a predetermined number of times.

13. The computer system of claim 10, wherein in response to determining that the first data is updated data corresponding to original data stored in the first band, the method further comprises:
marking as invalid a corresponding portion of the original data of the first band;
performing a defragmentation operation based on the marked data; and
in response to determining an available band based on the defragmentation operation, releasing the available band to the pool of free bands.

14. The computer system of claim 10, wherein in response to determining that the first data is not updated data corresponding to original data stored in the bands, the method further comprises:
accumulating new data in a buffer by storing the first data in the buffer; and
in response to determining that the buffer includes data of a size sufficient to fill an entire band:
obtaining a second new band from the pool of free bands;
writing the accumulated data from the buffer to the second new band; and
updating a mapping of a logical block address of the accumulated new data to a physical block address of the system.

15. The computer system of claim 10, wherein the updated data is appended to the second band starting sequentially from a first available portion of the second band.

16. The computer system of claim 10, wherein in response to determining that the first data is updated data corresponding to original data stored in the first band, the method further comprises:
determining that a spare sector may be allocated for storing the first data:
allocating the spare sector;
writing the first data to the allocated spare sector; and
updating a mapping of a logical block address of the first data to a physical block address of the system.

17. The computer system of claim 10, wherein the plurality of bands includes a first group of bands and a second group of bands, and
wherein new data is written to the first group, and wherein updated data corresponding to data stored in the first group is written to the second group.

18. The computer system of claim 17, wherein the device includes a spare sector area, and
wherein new data is written to the plurality of bands, and wherein updated data corresponding to data stored in the first group is written to the spare sector area.

19. A storage device, comprising:
a plurality of bands with overlapping tracks for storing data, wherein the plurality of bands includes a first group of bands and a second group of bands, wherein new data is written to the first group, and wherein updated data corresponding to data stored in the first group is written to the second group; and
a controller module configured to:
receive a request to write first data;
in response to determining that the first data is updated data corresponding to original data stored in a first band;
determine whether an available storage space of a second band is less than a predetermined threshold;
in response to determining that the available storage space of the second band is not less than the predetermined threshold, append the updated data corresponding to the original data to a second band with available storage space; and
in response to determining that the available storage space of the second band is less than the predetermined threshold:
obtain a new band from a pool of free bands; and
append a remainder of the first data to the new band; and
merge the updated data corresponding to the original data with the original data.

* * * * *